H. H. STYLL.
EYE PROTECTOR.
APPLICATION FILED DEC. 3, 1920.
1,421,744.
Patented July 4, 1922.
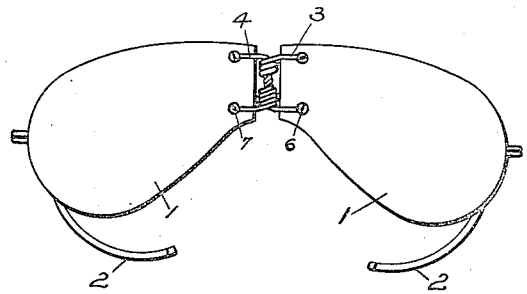
Fig. I
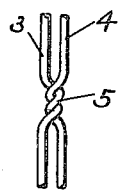
Fig. II
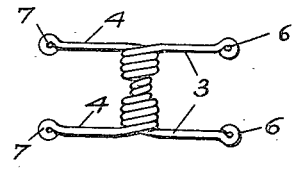
Fig. III
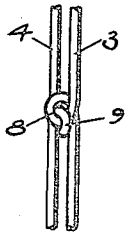
Fig. IV
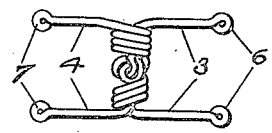
Fig. V
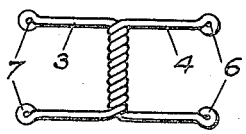
Fig. VI
INVENTOR
H.H. STYLL
BY
ATTORNEYS

UNITED STATES PATENT OFFICE.

HARRY H. STYLL, OF SOUTHBRIDGE, MASSACHUSETTS.

EYE PROTECTOR.

1,421,744. Specification of Letters Patent. Patented July 4, 1922.

Original application filed December 9, 1919, Serial No. 343,535. Divided and this application filed December 3, 1920. Serial No. 428,058.

*To all whom it may concern:*

Be it known that I, HARRY H. STYLL, a citizen of the United States, residing at Southbridge, in the county of Worcester and State of Masssachusetts, have invented certain new and useful Improvements in Eye Protectors, of which the following is a specification.

This invention relates to improvements in eye protectors and is a division of my application filed December 9, 1919, Serial No. 343,535, which issued as Patent 1,363,689 of December 28, 1920.

The principal object of the present invention is the provision of an improved construction of flexible center or connection between the lenses of goggles, eye protectors, or the like, which will allow of the mounting being automatically adjusted to properly fit around the face of the wearer, and which will possess the additional advantage of flexibility, allowing the lenses to have limited play with respect to each other and without fixed stops, thus lessening the danger of breakage of the parts under service conditions.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of the invention.

Figure I represents a front view of a protector embodying my improvement.

Figure II represents a detail view of one form of the construction in process of manufacture.

Figure III represents an enlarged view of the complete center or connection as formed from the part shown in Figure II.

Figure IV represents a view similar to Figure II of a slightly modified construction.

Figure V represents a view similar to Figure III of the complete bridge made therefrom.

Figure VI represents a similar view of a simplified type of construction.

In the drawings, the numeral 1 designates a pair of lenses which are preferably of shape to fit and satisfactorily cover and protect the eyes of the wearer, being retained in position on the face by the temples 2, and being centrally connected by my improved flexible bridge member. This member is formed as illustrated in Figures II and III, of a pair of wires 3 and 4, which are twisted together or suitably united as at 5 and then subsequently wound into a common helix with the two ends of the wire 3 extending laterally to one side and formed into the eyes 6 and the two ends of the wire 4 extending laterally to the opposite side and formed with the eyes 7. It will thus be seen that the two ends of one of the wires are connected to the right hand lens and the two ends of the other wire are connected to the left hand lens. On account, however, of their rigid central connection as at 5 the wires are held against loose swinging movement but having the flexibility imparted by the two spring coils or helices so that the lenses may be bent or flexed with respect to each other at the center and the protector may readily accommodate itself to varying shapes of faces without liability of breakage of the lenses.

Further by this construction I am able to avoid the necessity of use of supplemental pivot or connecting members, braces, or the like, since the connecting together of the two parts at their center securely holds them in desired relative position and while allowing of maximum flexibility prevents relative displacement of the parts.

Figures IV and V illustrate a construction quite similar to that shown in Figures II and III, in that I again have the wires 3 and 4 centrally united. The difference is that in this case in place of the parts being wound in a common helix the wires 3 and 4 each have a central eye or loop formed therein, the wire 3 having the loop 8 and the wire 4 the loop 9, interlocking with each other, as is most clearly shown in Figure IV, in this instance as before the terminal of the wire 3 being secured to one lens and the termini of the wire 4 secured to the other lens.

Figure VI illustrates the simplest form of construction in which the two members 3 and 4 are twisted together the greater part of their length with their ends free and extending the ends of one wire to the one lens and the ends of the opposite wire to the other. In this form there is also suitable arrangement made to so centrally tighten the winding as to prevent undue working or play of the wires one about the other, so that the parts will in all instances tend to return to and remain in predetermined adjustment one to the other except as the goggles may be varied by bending of the flexible laterally extending arms connecting the coiled central portion with the lenses. These arms are pliable and capable of bending to place the parts in desired initially adjusted relation.

I claim:

1. A device of the character described comprising a pair of members centrally rigidly united and having their ends extending outwardly, the two ends of one member being secured to one lens of a mounting and the two ends of the other being secured to the other lens.

2. A device of the character described comprising a pair of members centrally rigidly united and having their ends extending outwardly, the two ends of one member being secured to one lens of a mounting and the two ends of the other being secured to the other lens, said members intermediate their point of connection and their connection to the lens being provided with coils to increase their flexibility.

3. A device of the character described comprising a pair of centrally united wires formed into coils adjacent their centrally united point and having outwardly deflected ends for attachment to a lens, the ends of one member extending in one direction and the ends of the other member extending in the opposite direction.

4. A device of the character described comprising a pair of connecting wires centrally rigidly connected, one of said wires having a coiled portion extending upwardly from the connection and terminating in a laterally projecting attaching end, and the other of said wires having a downwardly extending coil portion terminating in a laterally deflected attaching end.

5. A device of the character described comprising a pair of connecting wires centrally rigidly connected, one of said wires having a coiled portion extending upwardly from the connection and terminating in a laterally projecting attaching end, and the other of said wires having a downwardly extending coil portion terminating in a laterally deflected attaching end, the attaching ends of the two members projecting substantially parallel with each other but in opposite directions.

6. A device of the character described comprising a pair of connecting wires centrally rigidly connected, one of said wires having a coil portion extending upwardly from the connection and terminating in a laterally projecting attaching end, and the other of said wires having a downwardly extending coil portion terminating in a laterally deflected attaching end, the attaching ends of the two members projecting substantially parallel with each other but in opposite directions, and the other ends of the two wire members being extended from their point of connection to opposite lenses.

In testimony whereof I have affixed my signature, in presence of two witnesses.

HARRY H. STYLL.

Witnesses:
  ESTHER M. LAFLER,
  ALICE G. HASKELL.